United States Patent [19]

Kohno et al.

[11] Patent Number: 4,775,042

[45] Date of Patent: Oct. 4, 1988

[54] CLUTCH DISC

[75] Inventors: Satoshi Kohno, Minamiashigara; Kazuhiro Kikuchi, Yokohama; Youichiro Yamada, Isehara; Tsutomu Nomura, Atsugi, all of Japan

[73] Assignees: Nissan Motor Co., Ltd., Yokohama; Atsugi Motor Parts, Co., Ltd., Atsugi, both of Japan

[21] Appl. No.: 836,507

[22] Filed: Mar. 5, 1986

[30] Foreign Application Priority Data

Mar. 6, 1985 [JP] Japan .................. 60-44112
Mar. 6, 1985 [JP] Japan .................. 60-44111
Jun. 20, 1985 [JP] Japan ............. 60-93287[U]
Aug. 5, 1985 [JP] Japan ............ 60-120156[U]

[51] Int. Cl.⁴ .................................. F16D 3/14
[52] U.S. Cl. .................... 192/106.2; 192/106.1; 464/24
[58] Field of Search .......... 192/70.17, 70.18, 70.27, 192/70.28, 106.1, 106.2, 110 R, 110 B; 464/24, 28, 68, 85, 17

[56] References Cited

U.S. PATENT DOCUMENTS

| 1,455,265 | 5/1923 | Rabb | 188/287 |
| 2,124,013 | 7/1938 | Spase | 192/106.2 |
| 2,337,134 | 12/1943 | Thelander | 192/106.2 |
| 2,513,379 | 7/1950 | Thelander | 192/106.2 |
| 2,674,863 | 4/1954 | Thelander | 192/106.2 |
| 4,351,167 | 9/1982 | Hanke et al. | 464/24 |
| 4,485,906 | 12/1984 | Lutz | 192/106.1 |
| 4,549,642 | 10/1985 | Loizeau | 192/106.2 |
| 4,565,273 | 1/1986 | Tojima | 192/106.2 |
| 4,601,676 | 7/1986 | Tojima | 464/24 |

FOREIGN PATENT DOCUMENTS

| 307086 | 10/1921 | Fed. Rep. of Germany . |
| 974310 | 12/1960 | Fed. Rep. of Germany . |
| 2311651 | 9/1974 | Fed. Rep. of Germany . |
| 2343791 | 3/1975 | Fed. Rep. of Germany . |
| 2742664 | 3/1979 | Fed. Rep. of Germany . |
| 3107517 | 12/1981 | Fed. Rep. of Germany . |
| 3228738 | 4/1983 | Fed. Rep. of Germany . |
| 832195 | 9/1938 | France . |
| 1350917 | 12/1963 | France . |
| 233368 | 12/1968 | U.S.S.R. ................ 464/24 |
| 2356847 | 1/1978 | France . |
| 574560 | 9/1977 | U.S.S.R. ................ 464/28 |
| 2022776A | 12/1979 | United Kingdom ....... 464/24 |

Primary Examiner—John E. Murtagh
Assistant Examiner—Andrew Joseph Rudy
Attorney, Agent, or Firm—Foley & Lardner, Schwartz, Jeffery, Schwaab, Mack, Blumenthal & Evans

[57] ABSTRACT

A clutch disc consists of a generally annular drive body connectable to an engine side and rotatably movably connected to a generally annular driven body connected to a vehicle drive line. The drive body is formed with a plurality of radially inwardly extending drive side arms. The driven body is formed with a plurality of radially outwardly extending driven side arms. A fluid chamber to be filled with a hydraulic fluid is formed between each drive side arm and each driven side arm. An orifice is formed between the inner periphery of the drive body and the radially outer-most portion of each driven side arm to provide a flow resistance to the fluid flowing between the adjacent fluid chambers, thereby effectively damping torque fluctuation transmitted from the engine side.

44 Claims, 17 Drawing Sheets

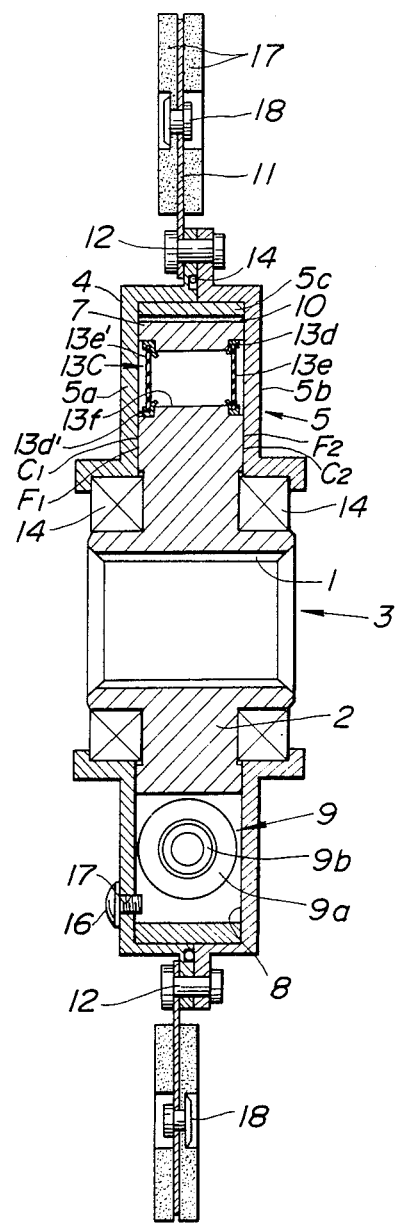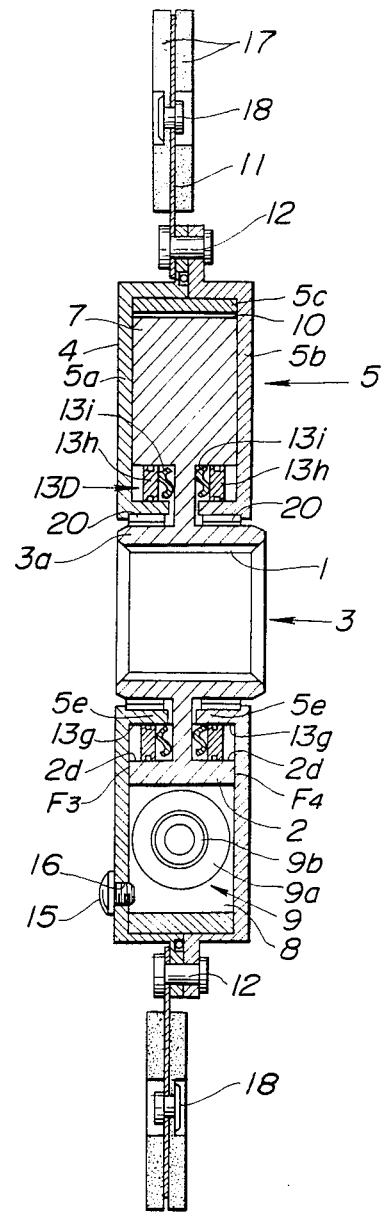

CLUTCH DISC

BACKGROUND OF THE INVENTION

1. Field of the Invention

The present invention relates generally to a driven clutch disc forming part of a clutch used in automotive vehicles and the like, and more particularly to the clutch disc of the type wherein a hydraulic fluid is used to constitute a damper for suppressing vibration applied to the clutch disc.

2. Description of the Prior Art

Recently a clutch disc of the type wherein a hydraulic fluid is used to constitute a damper has been proposed for the purpose of effectively suppressing booming noise due to torsional resonance vibration generated in a drive system on the side of an engine power output shaft and vibration caused during acceleration and deceleration of a vehicle. This clutch disc includes the damper disposed between drive (input) and driven (output) bodies which are connected to be rotatable relative to each other. The damper consists of an elastic cylindrical member provided at the opposite ends with damper sheets which are engaged with the drive body. A relatively thin partition plate fixed to the driven body is provided to divide the inside of the elastic cylindrical member into two chambers which are filled with the hydraulic fluid. Additionally, the partition plate is formed with an orifice through which the two chambers are in fluid communication with each other for the purpose of providing flow resistance to fluid flow between the two chambers.

The thus arranged conventional clutch disc operates as follows: When a relative rotation is made between the drive and driven bodies to abruptly compress one of the two chambers, an abrupt pressure rise is produced in the compressed chamber and then gradually released through the orifice into the other chamber, thereby effectively damping torque fluctuation of a drive system. However, drawbacks have been encountered in the conventional clutch disc in which a sufficient damping effect has not been exhibited thereby making it impossible to obtain a greater damping amount, for the reason that the length of the orifice is smaller because the orifice is formed through the relatively thin partition plate.

SUMMARY OF THE INVENTION

A clutch disc according to the present invention consists of a generally annular driven body including a radially outwardly extending flange section. The flange section has a plurality of driven side arms which radially outwardly extend and are located at equal intervals in the direction of periphery of the driven body. A generally annular drive body is movably connected with the driven body in such a manner as to drive the driven body to allow a relative rotation therebetween. The drive body includes a cover section disposed to cover the driven body flange section, and a plurality of drive side arms which radially inwardly extend and are located at equal intervals in the direction of periphery of the drive body. A fluid chamber is defined between one of the driven side arms and one of the drive side arms and filled with a fluid, in which the adjacent two fluid chambers constitute a damping unit. Additionally, an orifice is formed to establish communication between the adjacent two fluid chambers constituting the damping unit. The orifice is formed under cooperation of at least one of each driven side arm and each drive side arm.

Accordingly, when a pressure differential is produced between the adjacent fluid chambers upon an abrupt relative rotation between the drive and driven bodies, fluid flow is made through the orifice between the adjacent fluid chambers with a predetermined flow resistance, in which torque fluctuation from a drive system of an engine can be effectively damped upon energy loss of the fluid passing through the orifice.

In the case where the orifice is formed between the inner periphery of the drive body and the radially outermost portion of each driven side arm, the orifice is located far from the rotational axis of the drive and driven bodies, and additionally is formed longer in the peripheral direction of the clutch disc, thereby providing a larger damping force. This effectively prevent generation of booming noise due to torsional resonance vibration and vibration during vehicle acceleration and deceleration.

Otherwise, in the case where the orifice is formed in at least one of each driven side arm and each drive side arm which has a relatively large thickness in the peripheral direction, the length of the orifice becomes larger and therefore the orifice can be provided with a mechanism for controlling the cross-sectional area of the orifice in accordance with the angle of relative rotation between the drive and driven bodies, thereby providing an appropriate damping force in accordance with the magnitude of torque fluctuation applied from an engine side to this clutch disc.

BRIEF DESCRIPTION OF THE DRAWINGS

The features and advantages of the clutch disc according to the present invention will be more clearly appreciated from the following description taken in conjunction with the accompanying drawings in which like reference numerals designate corresponding parts and elements, and in which:

FIG. 11 is a cross-sectional view similar to FIG. 9 but showing a sixth embodiment of the clutch disc according to the present invention;

FIG. 12 is a cross-sectional view similar to FIG. 9 but showing a seventh embodiment of the clutch disc according to the present invention;

DETAILED DESCRIPTION OF THE INVENTION

Figure 1:
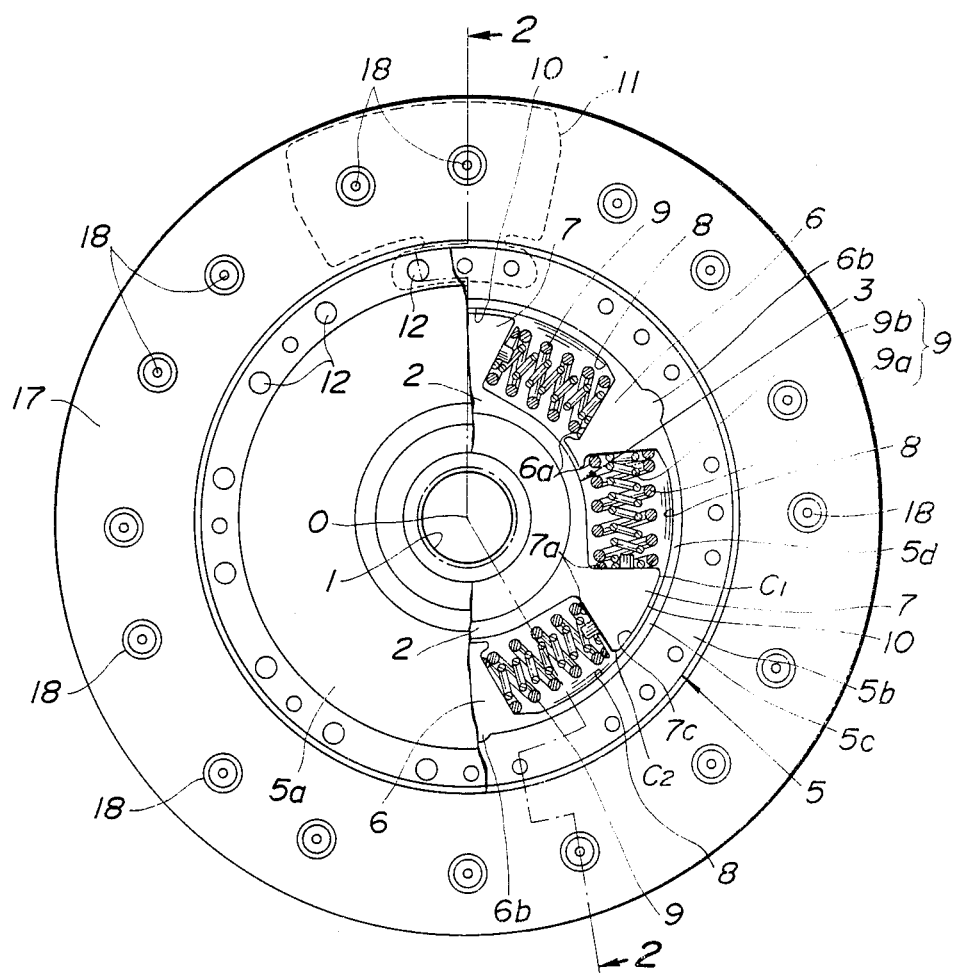
FIG. 1 is a front view, being partly cut away, of a first embodiment of a clutch disc according to the present invention.
Figure 2:
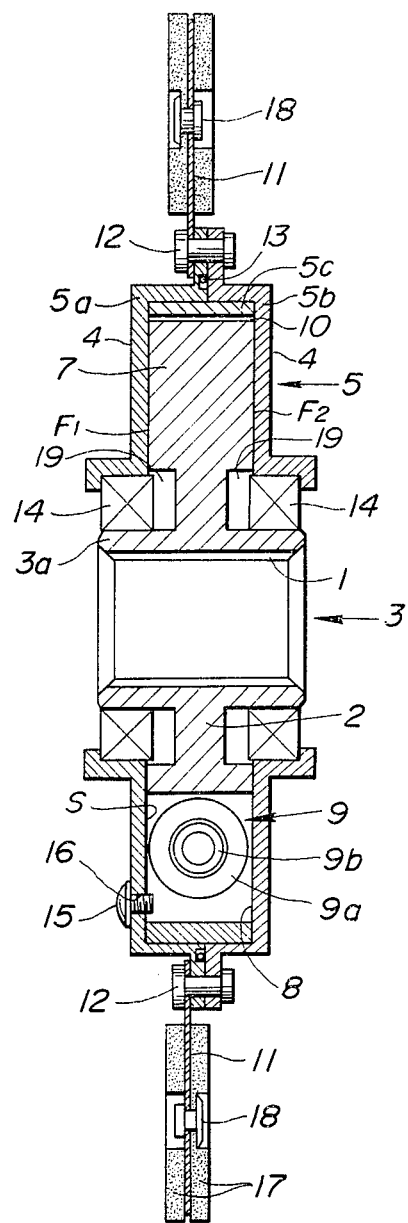
FIG. 2 is a cross-sectional view taken in the direction of arrows substantially along the line 2—2 of FIG. 1.
Figure 3:
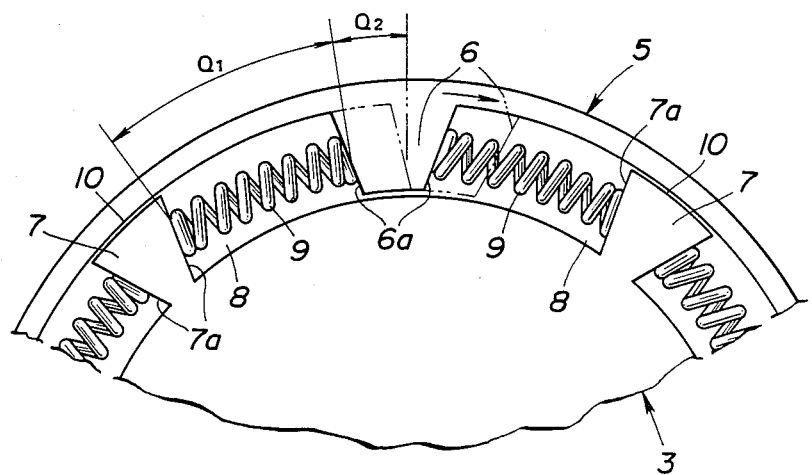
FIG. 3 is a schematic illustration showing the state of the clutch disc of the FIG. 1 in which a drive body rotates in the peripheral direction.

Referring now to FIGS. 1 and 2, there is shown a first embodiment of a driven clutch disc in accordance with the present invention. The clutch disc forming part of a clutch which is arranged to connect an engine and a drive line to power a vehicle and to disconnect the engine and the drive line. The clutch disc comprising a driven or power output body 3 which is generally annular and formed at its inner periphery which a splined portion 1 with which a power output shaft of the drive line is engaged. The driven body 3 includes a flange section 2 which extends radially and outeardly. The flange section 2 is formed with a plurality (three) of driven side arms 6 which extend radially outwardly and are located at equal intervals in the direction of periphery of the flange section 2. A drive or power input body 5 includes a cover section 4 disposed along the driven body flange section 2 in such a manner as to cover the flange section 2. The drive body 5 is rotatably movable relative to the driven body 3 and formed with a plurality (three) of drive side arms 7 which project radially inwardly at equal intervals in the direction of periphery of the drive body 5. A fluid chamber 8 is defined between the adjacent drive and driven side arms 6, 7, so that a plurality of fluid chambers 8 are provided in the clutch disc. Additionally, an elastic body 9 is disposed within a fluid chamber 8 so that a plurality (six) of elastic bodies 9 are provided in whole the clutch disc. A hydraulic or operating fluid such as silicone oil is filled in all the fluid chambers 8. It is to be noted that an orifice 10 is formed between the inner periphery of the drive body 5 and the radially outer-most portion of each driven side arm 7 so that a plurality of the orifices 10 are provided in whole the clutch disc. Each orifice 10 functions to provide a flow resistance to flow movement of the fluid to be made between the adjacent fluid chambers 8, thereby damping the torsional vibration generated between the drive and driven side bodies 5, 3.

The drive body 5 includes a pair of generally annular drive plates 5a, 5b which are located opposite to each other and disposed on the opposite sides of the flange section 2, thereby forming the cover section 4. The drive plates 5a, 5b are connected together at their outer peripheral portion and together with a cushioning plate 11 by means of cushioning rivets 12. A generally annular backing plate 5c is disposed inside cover section 4 and connected to cover section 4 in such a manner as to prevent the backing plate 5c from its rotational movement in the peripheral direction by means of a plurality of rounded projections which are in engagement with inner peripheral surface of the cover section 4 or the connected opposite drive plates 5a, 5b.

The backing plate 5c includes an annular section 5d disposed along the inner peripheral surface of the cover section 4 so as to be in direct contact with the drive plates 5a, 5b. The three drive side arms 6 are projected radially inwardly from the annular section 5d. Each drive side arm 6 is generally in the triangular shape in cross-section in an imaginary plane perpendicular to the axis of the backing plate 5c, in which the width of the arm becomes smaller in the radially inward direction; however, the most-outward portion of the arm is slightly widended as shown in FIG. 1. In this connection, each of the three driven side arms 7 located between the drive side arms 6 along the peripheral direction of the backing plate 5c. Each driven side arm 7 is generally in the triangular shape in the cross-section in the imaginary plane, in which the width of the arm becomes larger in the radially outward direction. Each driven side arm 7 has at its outer-most portion two opposite corners $C_1$, $C_2$ extending in the axial direction of the drive body 3. The driven side arm 7 is formed between the corners $C_1$, $C_2$ with the outer-most surface 7c having a same curvature as that of the inner periphery of the backing plate 5c. It will be understood that a small clearance serving as the orifice 10 is formed between the outer-most surface of the driven side arm 7 and the inner peripheral surface of the backing plate 5c. Beveling is made to the axially extending corners $C_1$, $C_2$ of the driven side arm 7 so that the fluid within the fluid chamber 8 is smoothly introduced into the orifice 10 thereby to obtain stable damping ability. As shown in FIG. 2, the opposite side faces $F_1$, $F_2$ of the driven side arm 7 is in slidable contact with the inner surfaces of the drive plates 5a, 5b. Similarly, the opposite side faces (not identified) of the drive side arm 6 are in slidable contact with the inner surfaces of the drive plates 5a, 5b.

Each elastic body 9 is disposed between the adjacent drive and driven side arms 6, 7 and consists of large-diameter and small-diameter compression springs 9a, 9b which are coaxially disposed in such a manner as to provide a biasing force to the drive and driven side arms 6, 7 in the direction to separate the arms 6, 7 from each other. The opposite ends of each spring 9a, 9b are in press contact with the spring retainer faces 6a, 7a of the drive and driven arms 6, 7, respectively. The free length of the springs 9a, 9b is longer than the total of a peripheral direction distance $Q_1$ of the fluid chamber 8 in a standard condition before operation of the clutch disc and an extended peripheral direction distance $Q_2$ of the fluid chamber 8 in a condition where the maximum torsional angle is made in the clutch disc, thereby preventing each spring 9a, 9b from chattering during operation of the clutch disc. A seal ring 13 is disposed between the peripheral portions of the drive plates 5a, 5b to prevent the fluid in the fluid chambers 8 from leaking out of the fluid chambers 8. Annular seal members 14 serving also as bearings are disposed between the hub 3a of the driven body 3 and the drive plates 5a, 5b for the purpose of preventing leaking of fluid to the outside of the fluid chamber 8. An air chamber 19 is formed between the driven body 3 and each seal member 14. As shown in FIG. 2, the drive plate 5a is formed with a hole 16 through which the fluid is poured into and discharged from the fluid chamber 8. The hole 16 is closed by a threaded plug 15. Additionally, annular clutch or friction facings 17 are secured to cushioning plate 11 by means of facing rivets 18.

The manner of operation of the first embodiment clutch disc will be discussed hereinafter.

First, when the drive body 5 rotates in the peripheral direction relative to the driven body 3 upon receiving a drive torque from the engine, the drive side arms 6 of the backing plate 5c forming part of the drive body 5 rotates in the same direction, so that one of the elastic bodies 9 disposed on the opposite sides of each drive side arm 6 is compressed to contract by the drive side arm 6. As a result, the drive torque from the engine is transmitted through the elastic body 9 to the driven body 3. At this time, the fluctuation of the drive torque is absorbed by the spring reaction of the elastic body 9. Simultaneously, the drive torque fluctuation is damped under the action of flow resistance of the fluid passing through each orifice 10. More specifically, when the drive body 5 abruptly rotates relative to the drive body 3, the pressure of one of the two fluid chambers 8 defined on the opposite sides of each drive side arm 6 of the drive body 3 abruptly rises, while the pressure of the other fluid chanmber 8 housing therein the other or expanded elastic member 9 abruptly lowers. Accordingly, under this pressure differential, the fluid of the former fluid chamber 8 flows through the orifice 10 into the latter fluid chamber 8, in which a predetermined magnitude of flow resistance is applied to the flow of the fluid under the action of the orifice 10 thus damping the vibration in the rotational direction of the drive body 5 relative to the driven body 3.

With the thus arranged clutch disc, since the orifice 10 for damping torsional vibration generated in a drive system is formed between the outer-most surface f the driven side arm 7 and the inner periphery of the drive body 5, the orifice 10 is located far from the rotational axis O of the drive and driven side bodies 5, 3, thereby obtaining a greater damping effect. Furthermore, by virtue of the fact that the orifice 10 is defined by the considerably long outer-most surface of the driven side arm 7 whose wide becomes larger in the radially outward direction, the peripheral length of the orifice 10 is formed longer, thereby providing a greater flow resistance to the fluid flow between the adjacent fluid chambers 8, thus to obtain a greater amount of damping. Furthermore, if silicone oil is used as the fluid filled in the fluid chamber 8, the variation in damping amount can be suppressed to a lower level since the silicone oil has a relatively high heat resistance temperature and is less in viscosity variation. This provides a stable damping characteristics throughout a wide range of temperatures at which the clutch disc is used.

In addition, the viscosity of the fluid to be filled in the fluid chambers 8 can be selected, and accordingly adjustment of the damping amount is easily accomplished to a variety of levels. Further, since the free length of each elastic body 9 is set longer than the total of the peripheral direction distance $Q_1$ in the standard condition before operation of the clutch disc and the extended peripheral direction distance $Q_2$ in the condition of the maximum torsional angle of the clutch disc, the opposite ends of each elastic body 9 can be kept in elastic contact with the spring retainer faces 6a, 7a, respectively, even in the case where the clutch disc becomes into the clutch disc maximum torsional angle condition. Consequently, even when each elastic body 9 receives a centrifugal force generated by the operation of the clutch disc, the location of each elastic body 9 cannot shift radially and outwardly, thus always maintaining the elastic body 9 in a proper location posture. Besides, this prevents generation of noise caused by the play in the clutch disc during operation, while avoiding abnormal wear made between each elastic body 9 and the drive and driven bodies 5, 3.

Figure 5:
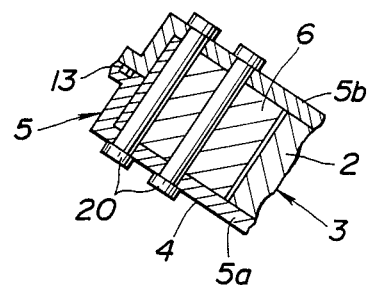
FIG. 5 is a fragmentary sectional view taken in the direction of arrows substantially along the line 5—5 of FIG. 4.
Figure 4:
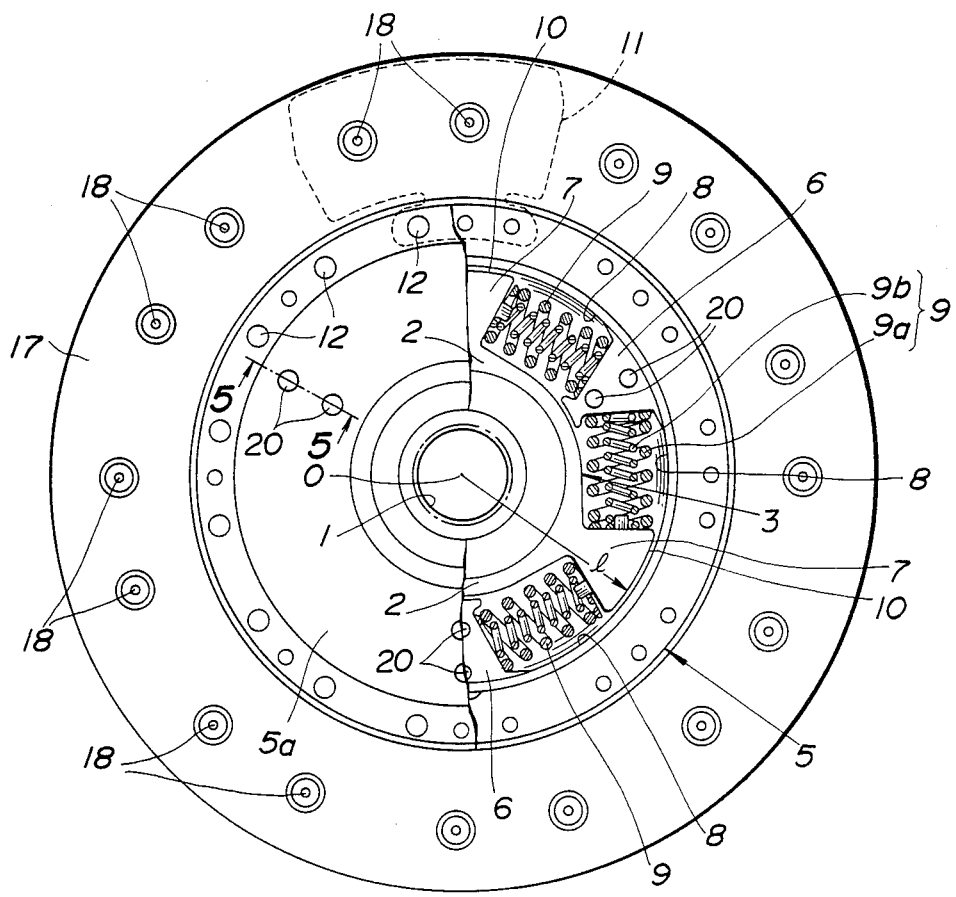
FIG. 4 is a front view similar to FIG. 1 but showing a second embodiment of the clutch disc according to the present invention.

FIGS. 4 and 5 illustrates a second embodiment of the clutch disc according to the present invention, which is similar to the first embodiment except for the installation structure of the drive side arms 6. In this embodiment, the drive side arms 6 are disposed inside the cover section 4 formed of the drive plates 5a, 5b and located at equal intervals in the peripheral direction of the cover section 4. The thus disposed each drive side arm 6 is secured in position by means of a plurality of fixing pins 20 as shown in FIG. 5.

With this arrangement, the annular section 5d of the backing plate 5c is omitted and therefore not only material cost can be reduced, but also the radius l of the driven side arm 7 is enlarged by an amount corresponding to the thickness (or the radial direction width) of the annular section 5d of the backing plate 5c. The locus of the radius l corresponds to the above-mentioned curvature of the outer-most surface of the drive side arm 7. This makes the location of the orifice 10 farther from the rotational axis O of the drive and driven bodies 5, 3 thereby further enlarging the peripheral length of the orifice 10. This provides a further greater damping amount in the clutch disc.

Figure 6:
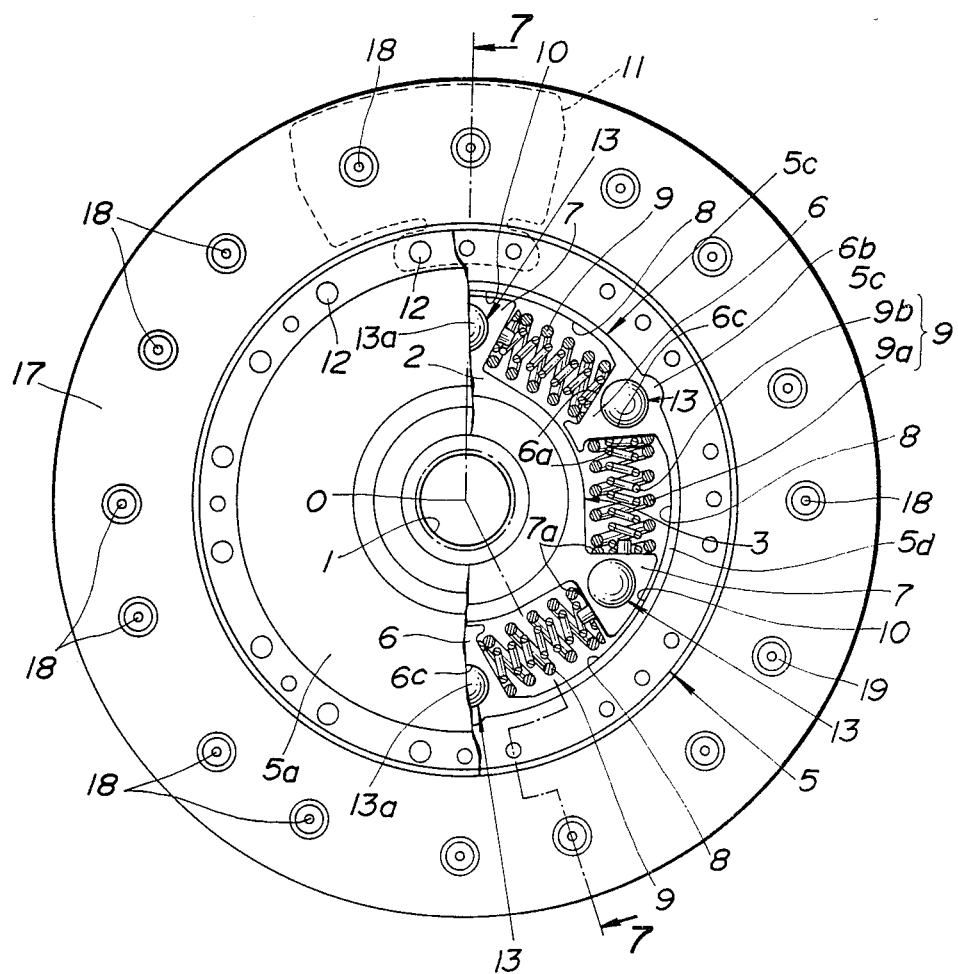
FIG. 6 is a front view similar to FIG. 1 but showing a third embodiment of clutch disc according to the present invention.
Figure 7:
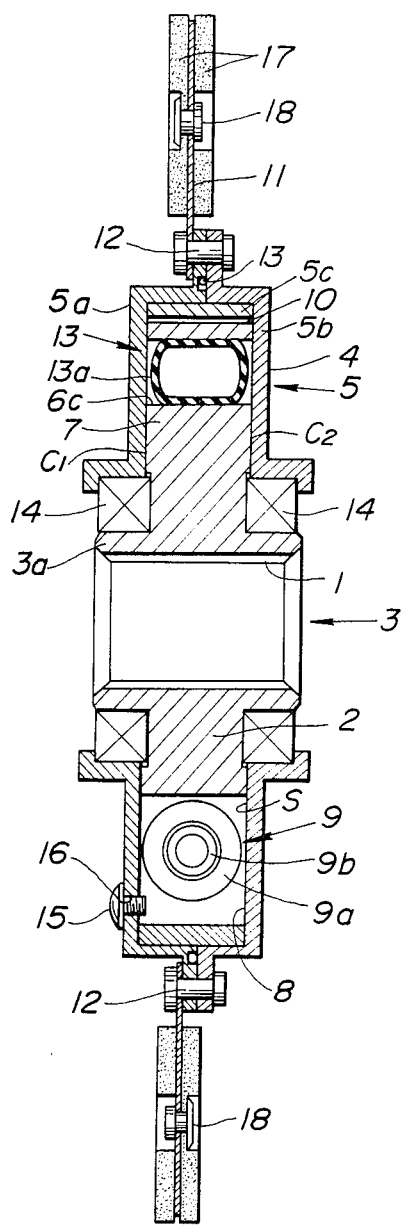
FIG. 7 is a cross-sectional view taken in the direction of arrows substantially along the line 7—7 of FIG. 6.

FIGS. 6 and 7 illustrate a third embodiment of the clutch disc according to the present invention, which is similar to the first embodiment with the exception that each of the drive and driven side arms 6, 7 is provided with a volume change compasating section 13 for compasating the volume change of the hydraulic fluid filled in the fluid chambers 8 which volume change is due to temperature change of the fluid. The volume change compensating section 13 includes a hollow elastic (elastomeric) member 13a disposed within a cylindrical through-hole 6c formed in each of the drive and driven side arms 6, 7. The through-hole 6c has an axis extending parallel with the rotational axis O of the drive and driven bodies 5, 3. In other words, the through-hole 6c extends in the direction of thickness of each of the drive and driven side arms 6, 7. A gas such as air is confined inside the hollow elastic member 13a.

With the thus arranged third embodiment clutch disc, the fluctuation of the driving torque is absorbed under the spring reaction of the elastic members 9, and the rotational direction vibration of the drive body 5 to the driven body 3 is damped in the same manner as in the first and second embodiments.

When the hydraulic fluid confined in the space S with fluid-tight seal thermally expands due to rise of temperature of ambient air around the clutch disc and due to heat generation within the clutch disc, a part (corresponding to a thermally expanded amount of the fluid) of the hydraulic fluid appears to leak out of the fluid chambers 8 through clearances $C_1$ and $C_2$ which are formed between the inner side faces of drive plates 5a, 5b and the outer side faces of each drive side arms 6 and between drive plates inner side faces and the outer side faces of the driven body flange section; however, the elastic member 13a contracts to absorb the thermally expanded amount of the fluid. On the contrary, when the hydraulic fluid contracts so that its volume is restored to the former condition upon the hydraulic fluid becoming at a normal temperature, the elastomeric member expands by an amount corresponding to the contracted amount of the fluid, so that a part of the fluid located within the through-hole 6c is pushed back to the fluid chambers 8. As a result, the fluid chambers 8 are again filled with the fluid.

Thus, according to the third embodiment clutch disc, even if the fluid within the fluid-tight seal space S and more specifically within the fluid chamber 8 thermally expands, the elastic member 13a contracts thereby to absorb the thermally expanded amount of the fluid. Accordingly, the fluid within the fluid chamber 8 is prevented from containing gas bubble, thus avoiding the fact that damping characteristics becomes unstable due to the compression of the gas bubble. On the contrary, in the case where the fluid contracts so that its volume is restored to the former condition, the elastic member 13a expands by the amount corresponding to the contracted amount of the fluid to fill the fluid chambers 8 with the fluid, thereby preventing air from entering the fluid chambers 8. It will be understood that an abrupt pressure rise occurs within the fluid chamber 8 during flow resistance being applied to the fluid moving between the fluid chambers 8, and therefore no contraction of the elastic member 13a is made under pressure supplied through the very small clearances $C_1$, $C_2$, so that the pressure rise within the fluid chamber 8 is kept higher thereby to make damping characteristics good. Furthermore, if the inner volume of the elastic member 13a is made the minimum within a range necessary for absorbing the thermal expansion of the fluid, a sufficient pressure rise within the fluid chamber 8 can be attained after the elastic member 13a is compressed.

Figure 8:
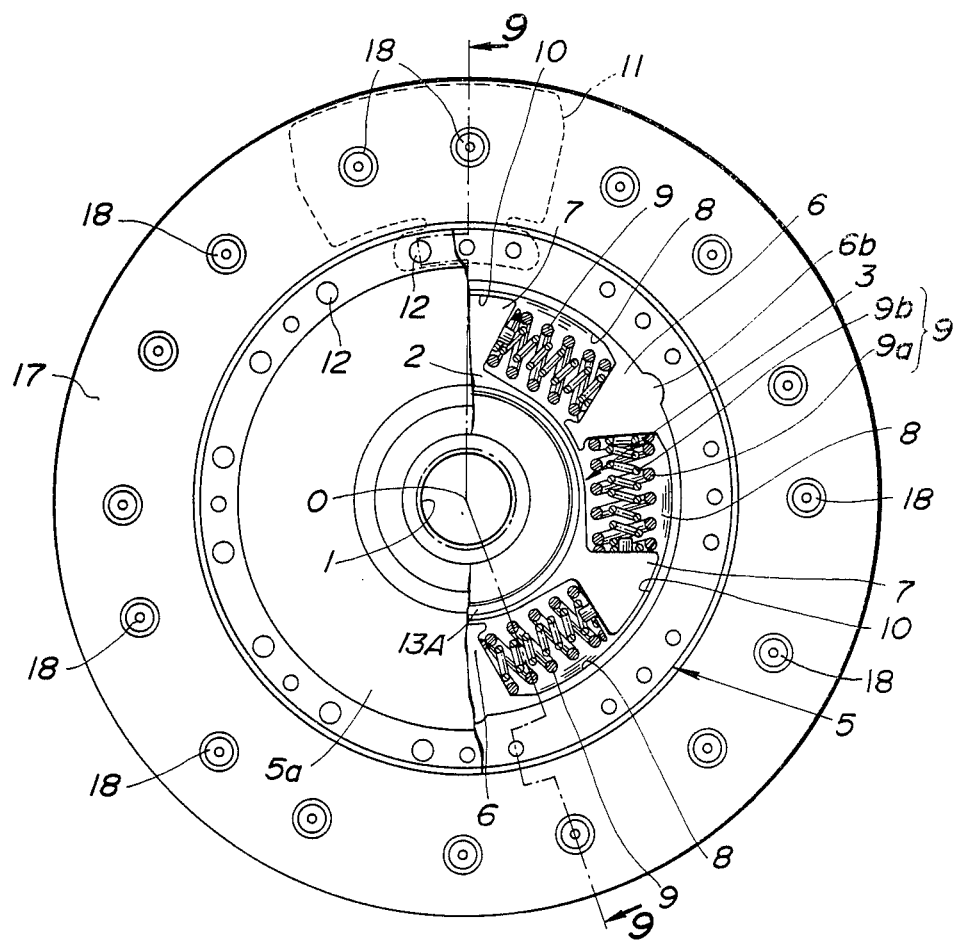
FIG. 8 is front view similar to FIG. 1 but showing a fourth embodiment of the clutch disc according to the present invention.
Figure 9:
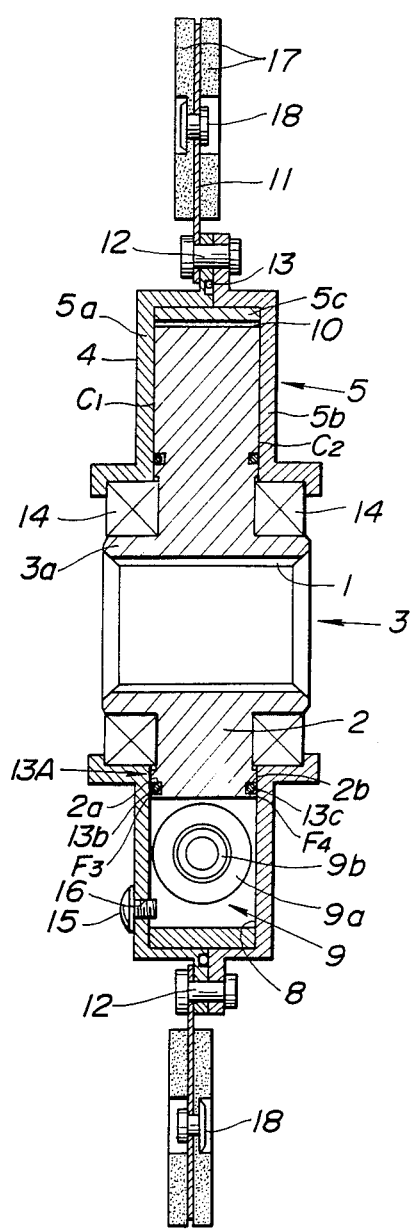
FIG. 9 is a cross-sectional view taken in the direction of arrows substantially along the line 9—9 of FIG. 8.

FIGS. 8 and 9 illustrate a fourth embodiment of the clutch disc according to the present invention, which is similar to the third embodiment with the exception that the volume change compensating section 13 is replaced with that 13A. The volume change compensating section 13A in this embodiment includes annular elastic (elastomeric) tubes 13b, 13c inside which a gas is confined. The elastic tubes 13b, 13c are respectively disposed in annular grooves 2a, 2b formed in the flange section 2 of the driven body 3 in such a manner as to surround the hub section 3a of the driven body 3. The annular grooves 2a, 2b are formed on the opposite side faces $F_3$, $F_4$ of the driven body flange section 2 which side faces are is in slidable contact with the inner surfaces of the drive plates 5a, 5b, respectively.

With this arrangement of the fourth embodiment clutch disc, when the fluid filled in the fluid chambers 8 makes its volume change due to temperature change, the volume change is compensated by the elastic expansion or contraction of the elastic tubes 13b, 13c. Additionally, since the elastic tubes 13b, 13c are located along the peripherally arranged fluid chambers 8, a part of the fluid flowing out of each fluid chamber 8 through the clearances $C_1$, $C_2$ can be uniformly received by the elastic tubes 13b, 13c, thereby absorbing the volume change of the fluid in the fluid chambers 8 throughout whole the elastic tubes 13b, 13c. Besides, the installation operation of the elastic tubes 13b, 13c is completed merely by placing the elastic tubes 13b, 13c into the annular grooves 2a, 2b of the driven body flange section 2, thus facilitating the assembly operation of the clutch disc.

Figure 10:
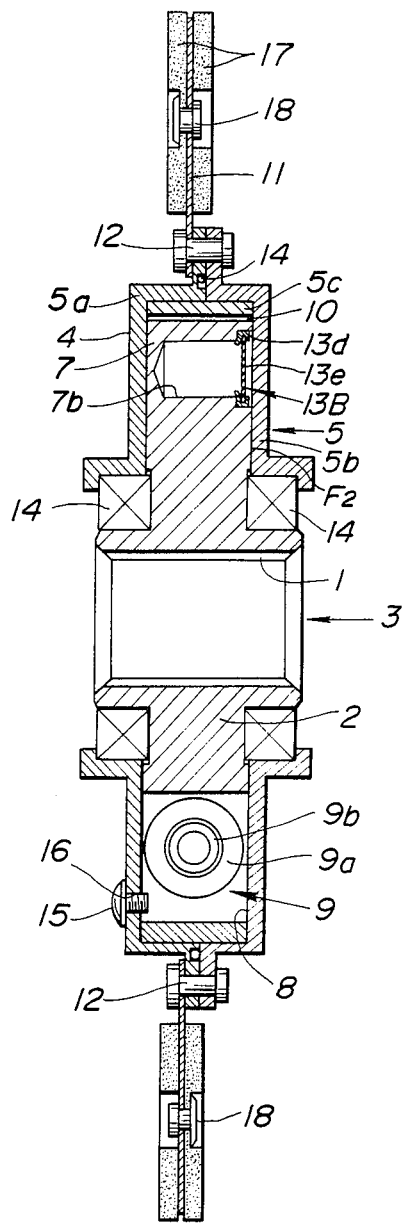
FIG. 10 is a cross-sectional view similar to FIG. 9 but showing a fifth embodiment of the clutch disc according to the present invention.

FIG. 10 illustrates a fifth embodiment of the clutch disc according to the present invention, which is similar to the third embodiment with the exception that the volume change compensating section 13 is replaced with that 13B. The volume change compensating section 13B of this embodiment includes an elastic (elastomeric) diaphragm 13d which is spreaded to cover the opening of a cylindrical hole 7b maintaining a fluid-tight seal. The periphery of the elastic diaphram 13e is fixed through an annular retainer 13d to a portion of each driven side arm 7 which portion surrounds the opening of the cylindrical hole 7b. The cylindrical hole 7b is formed in each driven side arm 7 and so located that axis thereof is parallel with the rotational axis O of the drive and driven bodies 5, 3. As shown, the opening of the cylindrical hole 7b is formed at one side face $F_2$ of each driven side arm 7, in which the elastic diaphram 13e is located slightly spaced from and opposite to the inner surface of the drive plate 5b. The inside of the cylindrical hole 7b is filled with a gas.

Also with this arrangement of the fifth embodiment clutch disc, the elastic diaphram 13e expands and contracts due to temperature change of the fluid within the fluid chambers 8, thus compensating the volume change of the fluid.

FIG. 11 illustrates a sixth embodiment of the clutch disc in accordance with the present invention, which is provided with the volume change compensating section 13C similar to that of the fifth embodiment. In this embodiment, the volume change compensating section 13C includes another elastic (elastomeric) diaphragm 13e' in addition to the elastic diaphram 13e. The elastic diaphram 13e' is spreaded to cover an opening of a through-hole 13f formed in each driven side arm 7 in such a manner that the axis thereof is parallel with the rotational axis O of the drive and driven side bodies 5, 3. The through-hole opening covered with the elastic diaphram 13e' is formed at the side face $F_1$ of each driven side arm 7, in which the periphery of the elastic diaphram 13e' is fixed through a retainer 13d' to a portion of the drive side arm 7 surrounding the through-hole opening. The elastic diaphram 13e' is located slightly spaced from and opposite to the inner surface of the drive plate 5a. The elastic diaphram 13e is disposed to cover the other opposite opening of the through-hole 13f in the same manner as in the fifth embodiment.

With this arrangement of the sixth embodiment, both the elastic diaphram 13d, 13d' can make their elastic expansion and contraction with temperature change of the fluid within the fluid chambers 8, thereby compensating for the volume change of the fluid flowing through the clearances $C_1$, $C_2$ between the fluid chambers 8. This makes volume change compensation action smooth and quich as compared with in the fifth embodiment.

FIG. 12 illustrates a seventh embodiment of the clutch disc in accordance with the present invention. In this embodiment, the flange section 2 of the driven body 3 is formed with two annular grooves 2d, 2d which are located in the vicinity of the hub or boss section 3a in such a manner as to surround the hub section 3a. One of the annular grooves 2d, 2d opens to the side face $F_3$ of the flange section 2 while the other opens to the side face $F_4$ of the same. The drive plates 5a, 5b are inwardly bent at their central portion defining a center opening (no numeral) in which the driven body hub section 3a is located, thereby forming cylindrical bent sections 5e, 5e which are opposite to each other. As shown, the cylindrical bent section 5e, 5e are projected into the grooves 2d, 2d, respectively, so that an annular chamber 13g *is defined between the cylindrical inner wall surface of the bend section 5e* and the outer cylindrical wall surface of the annular groove 2d. The cylindrical inner wall surface of the bend section 5e and the outer cylindrical wall surface of the annular groove 2d are coaxial with each other and extend parallel with the rotational axis O of the drive and driven bodies 5, 3. Two annular seal members 13h, 13h forming part of the volume change compensating section 13D are fittingly disposed within the annular chambers 13g, 13g, respectively, and are slidable in the axial direction of the clutch disc. A elastic or spring member 13i is disposed between each annular seal member 13h and the bottom surface of each annular groove 2d in such a manner as to provide a biasing force to each seal member 13h in the direction to always urge each seal member 13h outwardly, in which the seal member 13h is allowed to slidingly move inwardly and outwardly in accordance with volume change of the fluid filled in the fluid chambers 8 which volume change is due to temperature change. A bearing 20 is disposed between each drive plate bent section 5e and the inner cylindrical wall surface of the annular groove 2d or the outer surface of the hub section 3a to make further smooth the relative rotation between the drive and drive bodies 5, 3.

With this arrangement of the seventh embodiment, when the fluid within the fluid chambers 8 makes its volume change due to temperature change, the annular seal members 13h, 13h slidingly move axially under the spring action of the spring members 13i, 13i, thus effectively compensating for the volume change of the fluid filled in the fluid chambers 8.

Figure 13:
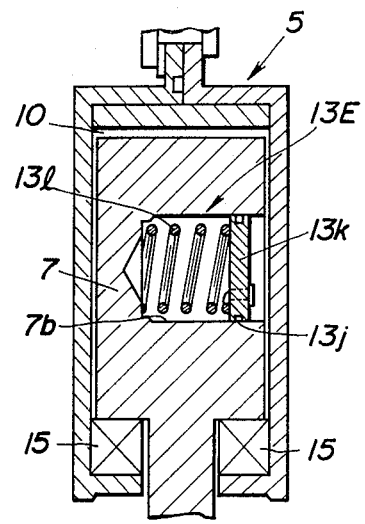
FIG. 13 is a fragmentary enlarged sectional view of an essential part of an eighth embodiment of the clutch disc according to the present invention.

FIG. 13 illustrates an eighth embodiment of the clutch disc in accordance with the present invention, which is similar to the fifth embodiment of FIG. 10 with the exception that the elastic diaphram 13e is replaced with a movable wall member 13k provided with a seal member 13j. The movable wall member 13k is fittingly disposed within the cylindrical hole 7b. The movable wall member 13k is always biased outwardly by means of an elastic or spring member 13l, so that the movable wall member 13k is movable inwardly and outwardly in accordance wih the volume change of the fluid within the fluid chambers 8. It will be understood that the volume change of the fluid with temperature change can be compensated by the axial movement of the movable wall member 13k.

Figure 14:
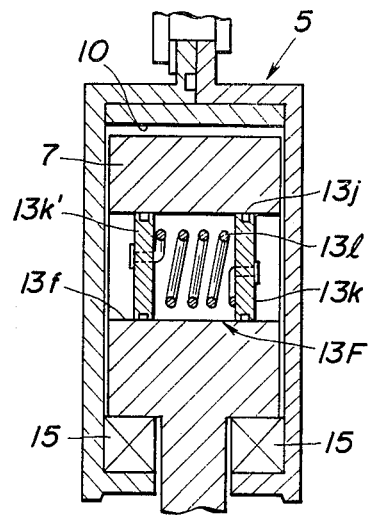
FIG. 14 is a fragmentary enlarged sectional view of an essential part of a ninth embodiment of the clutch disc according to the present invention.

FIG. 14 illustrates a ninth embodiment of the clutch disc in accordance with the present invention, which is similar to the sixth embodiment of FIG. 11 with the exception that the elastic diaphrams 13e, 13e' are respectively replaced with the movable wall member 13k and another movable wall member 13k'. The two movable wall members 13k, 13k' are fittingly and slidably disosed in the through hole 13f and located in parallel with each other. The elattic or spring member 13l is disposed between the movable wall members 13k, 13k' to bias them in the direction to separate from each other. The movable wall member 13k, 13k' are axially movable in accordance with the volume change of the fluid within the fluid chambers 8, thereby compensating for the volume change of the fluid due to temperature change.

Figure 15:
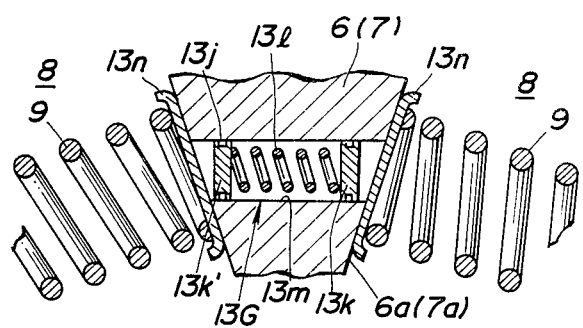
FIG. 15 is a fragmentary enlarged sectional view of an essential part of a tenth embodiment of the clutch disc according to the present invention.

FIG. 15 illustrates a tenth embodiment of the clutch disc in accordance with the present invention, which is similar to the ninth embodiment of FIG. 14 with the exception that the movable wall members 13k, 13k' and the elastic member 13l forming part of the volume change compensating section 13G are disposed in a through-hole 13m formed in each of the drive side arms 6 or in each of the driven side arms 7. As shown, the through-hole 13m is formed in such a manner that the adjacent fluid chambers 8, 8 are communicated with each other therethrough. Although each spring retainer 13n appears to prevent the communication between the through-hole 13m and the fluid chamber 8, fluid communication is made through a small clearance between the spring retainer 13n and the spring retaining face 6a (7a) of the drive or driven side arm 6 (7). The spring retainer 13h is used for the purpose of stably retaining the elastic member 9. It is preferable that a groove (not shown) having a cross-sectional area smaller than the orifice 10 is formed on the spring retaining face 6a (7a) or on the face of the spring retainer 13h facing to the spring retaining face 6a (7a), thereby establishing communication between the inside of the through-hole 13m and the fluid chambers 8. Thus, the volume change of the fluid within the fluid chambers 8 can be compensated under the axial movement of the movable wall membes 13k, 13k'.

While the volume change compensating section 13A, 13B, 13C, 13D, 13E, 13F or 13G has been shown and described as being formed in one of the drive and driven bodies 5, 3 in the fourth to tenth embodiments, it will be understood that the volume change compensating section may be formed both in the drive and driven bodies 5, 3, in which a further effective volume change compensation can be accomplished.

Figure 16:
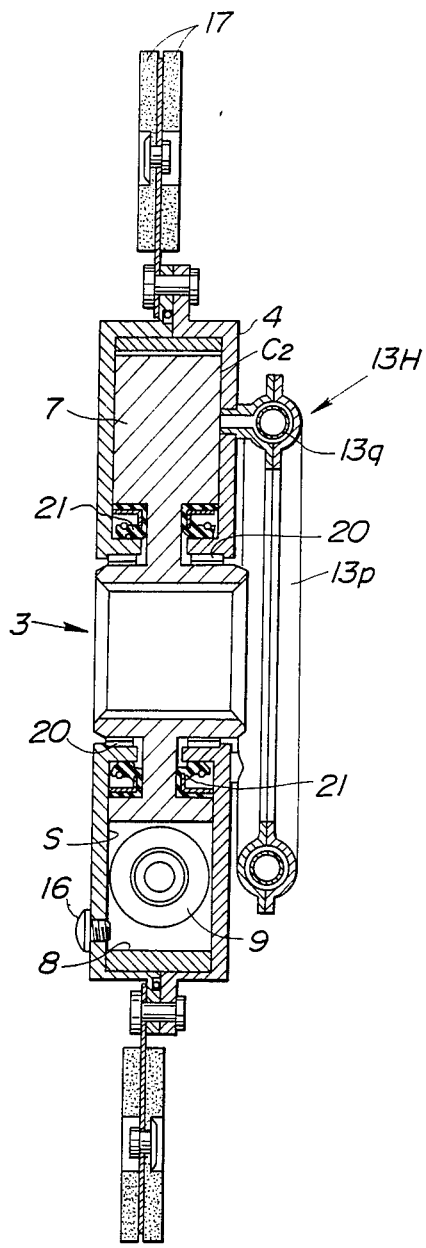
FIG. 16 is a cross-sectional view similar to FIG. 9 but showing an eleventh embodiment of the clutch disc according to the present invention.
Figure 17:
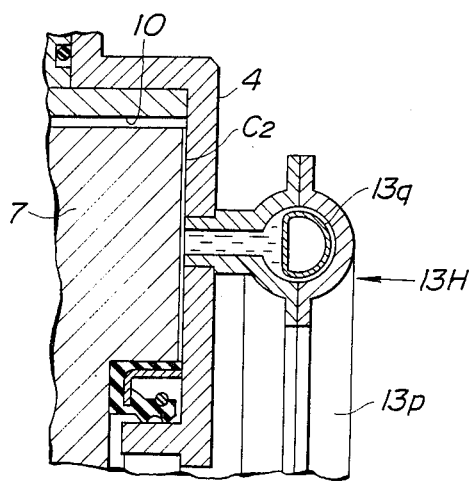
FIG. 17 is an enlarged sectional view of an essential part of FIG. 16.

FIGS. 16 and 17 illustrate an eleventh embodiment of the clutch disc according to the present invention, which is somewhat similar to the seventh embodiment of FIG. 12. In this embodiment, the volume change compensating section 13H includes an annular hollow casing 13p whose inside is communicated with the the clearance $C_2$ between the side face $F_2$ of the driven side arm 7 and the inner surface of the cover section 4 or of the drive plate 5b, so that the inside of the hollow casing 13p is filled with the fluid. Disposed inside the hollow casing 13p is an annular elastic (elastomeric) tube 13q in which a gas is confined. The reference numeral 21 denotes a seal member for maintaining a fluid-tight seal of the fluid chambers 8.

With this arrangement of the eleventh embodiment, when the fluid filled in the fluid chambers 8 makes its volume change due to temperature change, the elastic tube expands or contracts as shown in FIG. 17 thereby to compensate for the volume change of the fluid.

Figure 18:
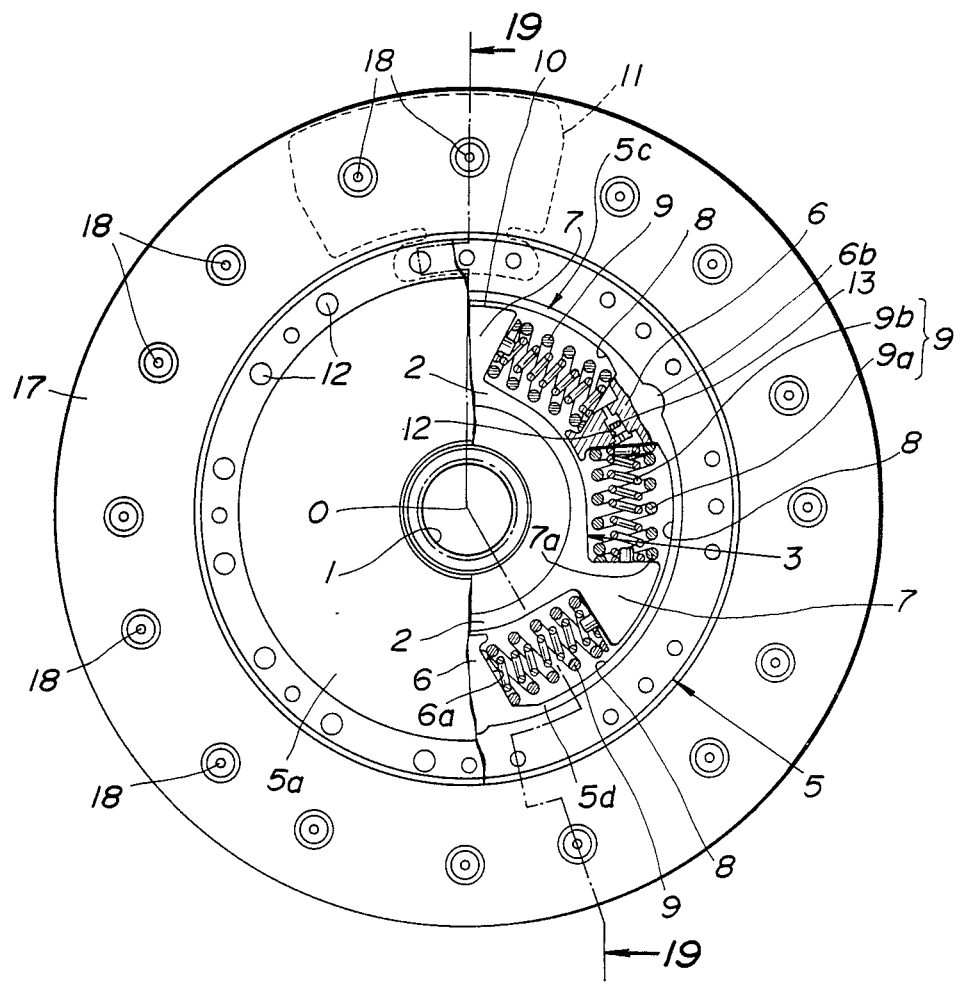
FIG. 18 is a front view similar to FIG. 1 but showing an twelfth embodiment of the clutch disc according to the present invention.
Figure 19:
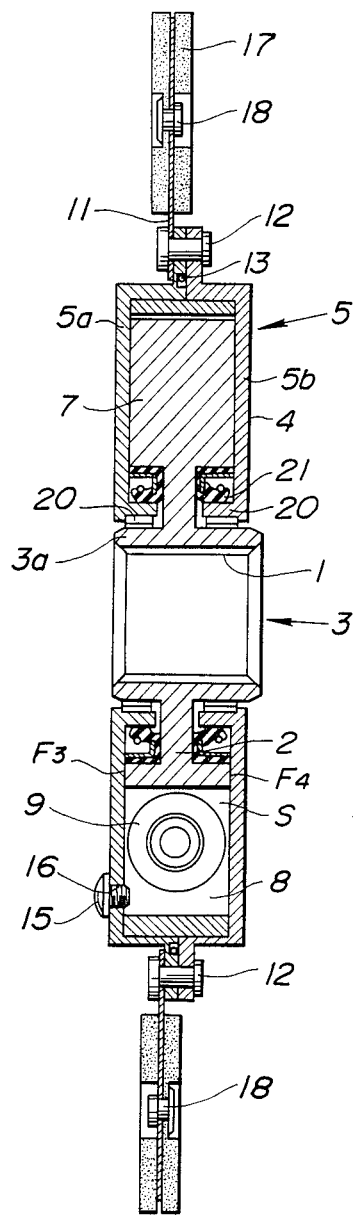
FIG. 19 is a cross-sectional view taken in the direction of arrows substantially along the line 19—19 of FIG. 18.
Figure 20:
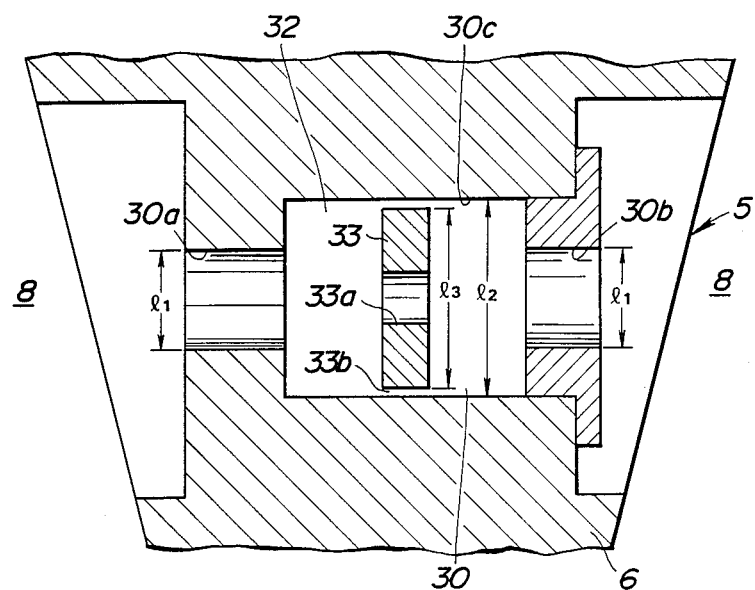
FIG. 20 is an enlarged sectional view of an essential part of the clutch disc of FIG. 18, illustrating a state where a floating member is in a neutral position.

FIGS. 18, 19 and 20 illustrate a twelfth embodiment of the clutch disc in accordance with the present invention, which is similar to the first embodiment with the exception that an orifice for providing a flow resistance to the fluid moving between the adjacent fluid chambers 8 is formed in each drive side arm 6. In this embodiment, the flange section 2 of the driven body 3 and the central section of the drive plates 5a, 5b are formed similar to those of the seventh embodiment of FIG. 12, in which the seal members 21, 21 are disposed between the flange section 2 and the drive plates 5a, 5b to maintain a fluid-tight seal therebetween.

Each drive side arm 6 of the drive body 5 is formed with a communicating hole 30 through which the adjacent fluid chambers 8, 8 are communicated with each other. The communicating hole 30 includes a first small diameter section 30a merged in one of the adjacent fluid chambers 8. The first small diameter section 30a is connected through a large diameter section 30c with a second small diameter section 30b. As shown in FIG. 20, the large diameter section 30c has a first end in which the first small diameter section 30a merges, and a second end in which the second small diameter section 30b merges. As shown, the second small diameter section 30b is formed through a closure plate 31 for closing one end of a large diameter hole (no numeral) a part of which serves as the large diameter section 30c. The first and second small diameter sections 30a, 30b has the same diameter $l_1$. The large diameter section 30c has a diameter $l_2$ larger than the diameter $l_1$, defining thereinside a space 32. A floating member 33 is disposed in the space 32 to be axially movable in accordance with the flowing movement of the fluid within the communicating hole 30. The floating member 33 is formed annular and has cylindrical inner and outer peripheral surfaces which are coaxial with each other. The outer diameter $l_3$ of the floating member 33 is larger than the diameter $l_1$ of the first and second small diameter sections 30a, 30b, and smaller than the diameter $l_2$ of the large diameter section 30c. The floating member 33 is formed at its central section with an orifice or through-hole 33a. Additionally, an annular orifice 33b can be formed between the outer peripheral surface of the floating member 33 and the wall surface of the communicating hole large diameter section 30c. It is to be noted that the total of the cross-sectional areas of the orifices 33a, 33b is larger than the cross-sectional area of each communicating hole small diameter section 30a (30b).

Figure 21:
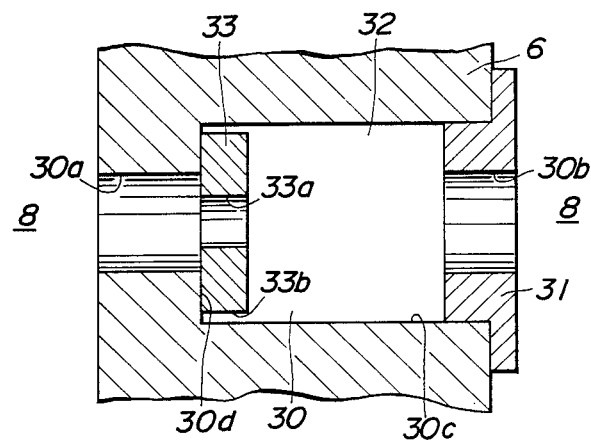
FIG. 21 is an enlarged sectional view similar to FIG. 20 but illustrating another state where the floating member has been moved leftward from the neutral position.

The manner of operation of the thus arranged twelfth embodiment clutch disc will be discussed hereinafter also with reference to FIG. 21.

During steady torque transmission in which a constant drive torque is transmitted from the drive system of the engine, the adjacent fluid chambers 8, 8 are balanced in pressure so that no pressure differential is produced. As a result, the floating member 33 is kept to stop in a neutral position within the space 32 as shown in FIG. 20. When a smaller torque fluctuation is applied from the drive system to the drive body 5, the drive body 3 rotates in the peripheral direction relative to the driven body 5 so that the drive side arms 6 formed with the backing plate 5c rotates in the same direction. Consequently, the elastic body 9 disposed in one of the adjacent fluid chambers 8, 8 located on the opposite sides of the drive side arm 6 is compressed by the drive side arm 6. As a result, the drive torque from the drive system is transmitted through the compressed elastic body 9 to the driven body 3. At this time, the abovementioned small torque fluctuation is absorbed under the spring reaction of each compressed elastic body 9. Simultaneously, the drive body 5 slightly rotates in the peripheral direction relative to the driven body 3 with the small torque fluctuation, so that one (housing therein the compressed elastic body 9) of the adjacent two fluid chambers 8, 8 divided by the driven side arm 7 gradually rises in pressure while the other fluid chamber 8 gradually drops in pressure, thereby producing a pressure differential between the adjacent fluid chambers 8, 8. Under this pressure differential, the fluid within one of the fluid chambers 8, 8 flowingly moves through the communicating hole 30 toward the other fluid chamber 8. At this time, the floating member 33 slightly moves slidingly but does not reach the small diameter section 30a because of the fact that the total cross-sectional area of the orifices 33a, 33b is larger than the cross-sectional area of each small diameter section 30a (30b). In this state, the fluid flows from one of the fluid chambers 8, 8 into the other fluid chamber 8 with a predetermined flow resistance due to the flow restriction action of the communicating hole small diameter sections 30a, 30b, thus making a smaller energy loss of the fluid. This provides a smaller damping force, thereby previously preventing generation of booming noise due to smaller torque fluctuation.

When the fluctuation of torque transmitted from the engine drive system is larger so that the angle of relative movement between the drive and driven bodies 5, 3 is larger, the pressure within one of the adjacent fluid chambers 8, 8 abruptly rises while the pressure within the other fluid chamber 8 abruptly drops thereby to enlarge the pressure differential between the adjacent fluid chambers 8, 8. Under this enlarged pressure differential, the floating member 33 largely slidingly moves toward the first small diameter section 30a and is pushed against a step-like face 30d formed at the border between the first small diameter section 30a and the large diameter section 30c so as to cover the first small diameter section 30a with the floating member 33 formed with the orifice 33a having a diameter smaller than that of the first small diameter section 30a as shown in FIG. 21. As a result, the fluid flowing from one of the adjacent fluid chambers 8, 8 to the other fluid chamber 8 passes only through the orifice 33a of the floating member 33, thus producing a larger energy loss of the flowing fluid due to a flow restriction action of the small diameter orifice 33a. As a result, a greater damping force can be obtained thereby to previously prevent vibration of the vehicle in the fore-and-aft direction due to large torque fluctuation. Thus, this embodiment can securely provide a variety of appropriate damping forces in accordance with the magnitude of the torque fluctuation transmitted from the drive system.

Figure 22:
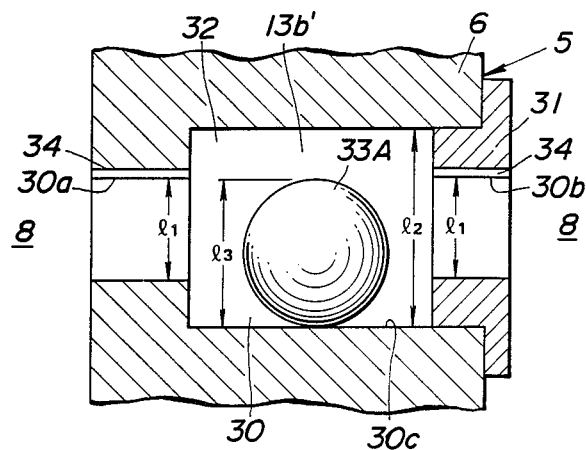
FIG. 22 is an enlarged sectional view similar to FIG. 20 but showing a thirteenth embodiment of the clutch disc according to the present invention, illustrating a state where a floating member is in a neutral position.
Figure 23:
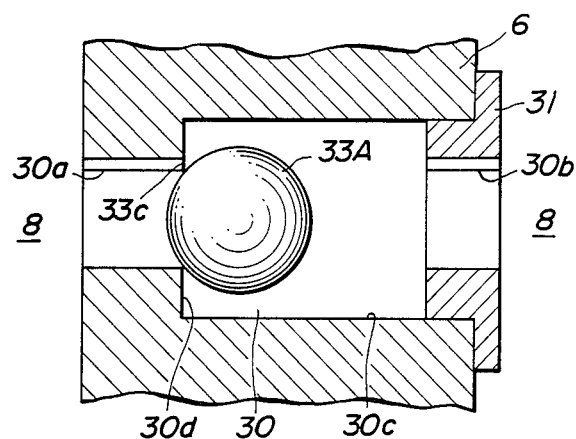
FIG. 23 is an enlarged sectional view similar to FIG. 22 but illustrating another state where the floating member has been moved leftward from the neutral position.

FIGS. 22 and 23 illustrate a thirteenth embodiment of the clutch disc in accordance with the present invention, which is similar to the twelfth embodiment with the exception that the annular floating member 33 is replaced with a spherical floating body 33A. The spherical floating body 33A is movably disposed with the space 32 and has a diameter $l_3'$ which is smaller than the diameter $l_2$ of the large diameter section 30a and larger than the diameter $l_1$ of the first or second small diameter section 30a, 30b. In this embodiment, each of the first and second small diameter sections 30a, 30b is formed non-circular for the purpose of preventing the small diameter sections 30a, 30b from being completely closed with the spherical floating member 33A. In this embodiment, each of the first and second small diameter sections 30a, 30b is formed at their cylindrical surface with an axially extending groove 34.

With this arrangement of the thirteenth embodiment, when the torque fluctuation is smaller, the angle of relative movement between the drive and driven bodies 5, 3 is smaller so that the pressure differential between the adjacent fluid chambers 8, 8 is smaller. Accordingly, the spherical floating member 33A slightly moves toward the first small diameter section 30a in the space 32 but does not reach the small diameter section 30a as shown in FIG. 22, forming an orifice 13b' between the outer spherical surface of the floating member 33A and the inner surface of the communicating hole large diameter section 30c. Accordingly, the fluid flowing from one of the adjacent fluid chambers 8, 8 to the other fluid chamber 8 passes through the larger orifice 13b', so that the first and second small diameter sections 30a, 30b are in the fully open state. This produces a smaller energy loss of the flowing fluid, thereby providing a smaller damping force.

When torque fluctuation is larger, the relative rotation angle between the drive and driven bodies 5, 3 is larger, so that a larger pressure differential is produced between the adjacent fluid chambers 8, 8. Under this large pressure differential, the spherical floating member 33A floatingly moves toward the first small diameter section 30a opening to the fluid chamber 8 whose pressure is lower than that of the other fluid chamber 8 and pushed against the step-like face 30d formed at the border between the first small diameter section 30a and the large diameter section 30c so as to cover the first small diameter section 30a with the floating member 33A as shown in FIG. 23. Accordingly, the fluid flows from one of the adjacent fluid chambers 8, 8 to the other fluid chamber 8 through a smaller orifice formed between the surface of the groove 34 and the surface of the floating member 33A. As a result, a larger flow resistance is provided to the flowing fluid under the flow restriction action of the orifice 33c, thereby making the energy loss of the fluid larger. This provides a larger dmaping force.

While the communicating hole 30 in which the floating member 33, 33A is disposed has been shown and described as being formed in each drive side arm 6 of the drive body 5 in the twelfth and thirteenth embodiments, it will be understood that the communication hole 30 may be formed in each driven side arm 7 of the driven body 3 or in both the drive and driven side arms 6, 7. It will be appreciated that the floating member 33, 33A can function against the communicating hole second small diameter section 30b in the same manner as against the first small diameter section 34, and therefore can function same for rotation of the clutch disc in the opposite directions.

Thus, according to the twelfth and thirteenth embodiments, the orifices having different cross-sectional areas can be selectively used for the purpose of providing flow resistances to the fluid flowing from one fluid chamber to the other fluid chamber in accordance with the magnitude of the torque fluctuation transmitted from the drive system of the engine, i.e., the magnitude of the relative rotation angle between the drive or drive bodies. This can provide an appropriate damping force in accordance with the magnitude of the torque fluctuation from the engine drive system.

Figure 24:
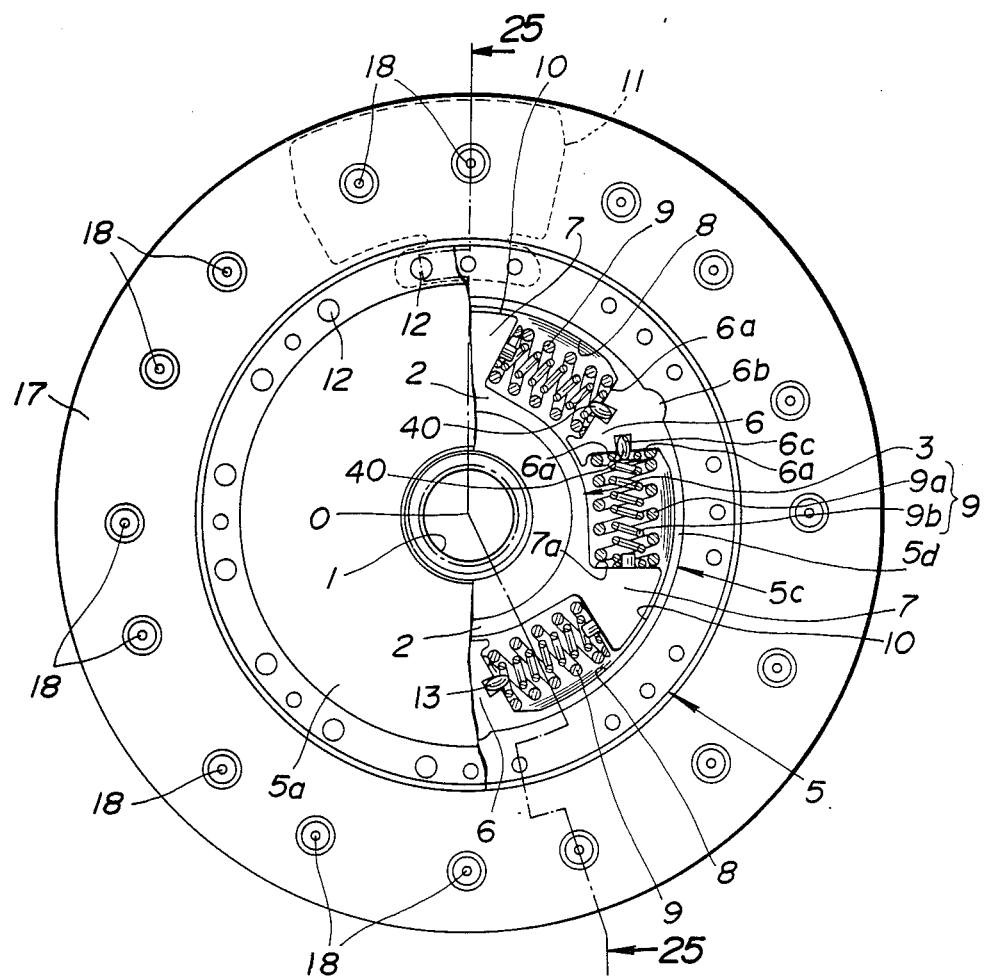
FIG. 24 is a cross-sectional view similar to FIG. 1 but showing a fourteenth embodiment of clutch disc according to the present invention.
Figure 25:
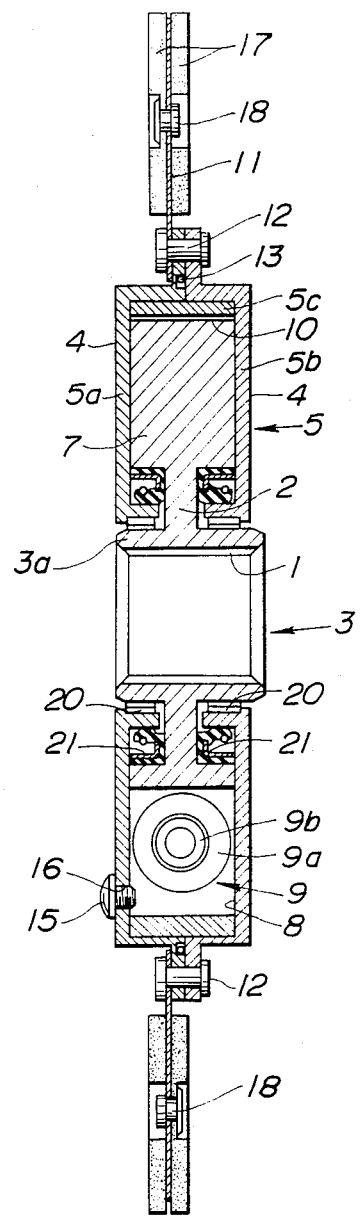
FIG. 25 is a cross sectional view taken in the direction of arrows substantially along the line 25—25 of FIG. 24.

FIGS. 24 and 25 illustrate a fourteenth embodiment of the clutch disc in accordance with the present invention, which is similar to the first embodiment with the exception that an elastic member 40 is disposed in each fluid chamber 8. In this embodiment, the drive plates 5a, 5b are formed similar to those of the seventh embodiment of FIG. 12, in which the seal members 21, 21 are disposed between the flange section 2 and the drive plates 5a, 5b to maintain a fluid-tight seal therebetween.

The elastic member 40 is generally egg-shaped and fittingly disposed in a groove 6c formed at each of the spring retaining faces 6a, 6a of each drive side arm 6 of the drive body 6. A gas such as air is confined under pressure in the elastic member 40. Accordingly, each elastic member 40 serves also as means for locating the elastic body 9.

With this arrangement of the fourteenth embodiment, when power input from the drive system is smaller in which the amplitude of torque fluctuation is smaller, each elastic member 40 contracts to decrease its volume, thus suppressing pressure fluctuation within each fluid chamber 8. As a result, the amount of the fluid passing through the orifice 10 formed between the drive body inner periphery and driven side body arm radially outer-most portion becomes very small or zero, thereby generating a smaller damping force. This minimizes the dynamic spring constant to improve vibration interrupting ability, thereby damping small amplitude torque fluctuation. On the contrary, when power input from the engine drive system is larger in which torque fluctuation amplitude is larger, a predetermined pressure differential is produced between the adjacent fluid chambers 8, 8 located on the opposite sides of each driven side arm 7, so that the fluid flowingly moves through each orifice 10 thereby to generate a larger damping force, thus damping the large amplitude torqu fluctuation. Thus, according to this embodiment clutch disc, vibration suppression effect is obtained with the smaller damping force due to the lower dynamic spring constant during the smaller torque fluctuation amplitude while with the larger damping force during the larger torque fluctuation amplitude, thus obtaining an appropriate damping force in accordance with the torque fluctuation amplitude.

What is claimed is:

1. A clutch disc comprising:
a generally annular driven body including a radially outwardly extending flange section, and a periphery, said flange portion having a plurality of driven side arms, each of said arms having side faces, said arms extending radially outwardly and being located at equal intervals in a direction toward said periphery of said driven body;
a generally annular driven body including a cover section having an inner surface and a periphery, said cover section disposed to cover said flange section of said driven body, and a plurality of drive side arms which radially inwardly extend and are located at equal intervals in direction of the periphery of said drive body, said drive body being rotatably movably connected to said driven body;

a friction surface secured to an outer peripheral portion of said drive body;
means defining a plurality of fluid chambers each of which is defined between one of said driven side arms and one of said drive side arms, each adjacent two fluid chambers constituting a damping unit;
a fluid filled in said plurality of fluid chambers;
means defining a pluraity of orifices one of which is formed to establish fluid communication between said adjacent two fluid chambers constituting said damp unit, each orifice being formed under cooperation of at least one of said drive and driven side arms;
a plurality of elastic means disposed in each of said fluid chambers and between said driven and drive side arms, to bias said driven and drive side arms in opposite directions; and
means for compensating volume change of said fluid within said fluid, chamber due to temperature change of said fluid.

2. A clutch disc as claimed in claim 1, further comprising means for suppressing smaller torque fluctuation transmitted to said drive body, said means including a plurality of elastic members each of which is disposed within each fluid chamber, said elastic member being formed thereinside with a chamber in which a gas is confined.

3. A clutch disc as claimed in claim 1, further comprising clutch facings fixedly connected to said drive side body cover section.

4. A clutch disc as claimed in claim 1, wherein said driven body is formed at its central part with a splined section engaged with a power output shaft of a drive line of a vehicle.

5. A clutch disc as claimed in claim 1, further comprising means allowing the side faces of each driven side arm to be in slidable contact with the inner surface of said drive side cover section.

6. A clutch disc as claimed in claim 1, further comprising means for maintaining fluid-tight seal between said drive body cover section and said driven body.

7. A clutch disc as claimed in claim 1, wherein each of said plurality of orifices is formed between inner periphery of said drive body and radially outer-most portion of said drive side arm to provide a flow resistance to said fluid flowingly moving between said adjacent two fluid chambers.

8. A clutch disc as claimed in claim 7, wherein each driven side arm is generally triangular in a plane perpendicular to a rotational axis of said drive and driven bodies, width of said driven side arm increasing in radially outward direction.

9. A clutch disc as claimed in claim 8, wherein surface of the radially outer-most portion of said driven side arm has a curvature identical with the inner periphery of said driven body, in which a peripherally elongate clearance serving as said orifice is formed between said driven side arm radially outer-most portion and said drive body inner periphery.

10. A clutch disc as claimed in claim 8, wherein each drive side arm is generally triangular in said plane, width of said drive side arm decreasing in radially inward direction, said drive side arm having a radially inner-most portion located in close proximity to said driven body flange section.

11. A clutch disc as claimed in claim 10, further comprising a plurality of compression springs each of which is disposed between said drive side arm and said driven side arm.

12. A clutch disc as claimed in claim 1, wherein said drive body includes an annular backing plate disposed along inner periphery of said cover section, in which said drive side arms are integral with and extend from said backing plate.

13. A clutch disc as claimed in claim 1, wherein drive side arms are disposed on inner periphery of said cover section and fixed to said cover section.

14. A clutch disc as claimed in claim 11, wherein each spring has a free length larger than a peripheral distance between said drive and driven arms during torsional angle between said drive and driven bodies being the maximum.

15. A clutch disc as claimed in claim 2, further comprising means defining a plurality of grooves each of which is formed in each drive side arm, said groove merging in said fluid chamber, a part of said elastic member being disposed within said groove.

16. A clutch disc as claimed in claim 15, wherein said drive side arm has a spring retaining face on which one end of a coil spring interposed between adjacent drive and driven side arms is seated, in which said groove is formed at said spring retaining face and located coaxial with said coil spring.

17. A clutch disc as claimed in claim 1, wherein each of said plurality of orifices is formed in at least one of each drive side arm and each driven side arm, in which said orifices defining means includes means defining a through-hole formed in said arm, said through-hole havig a first small diameter section merging in one of said fluid chambers, a second small diameter section merging in the other of said fluid chambers, and a large diameter section located between said first and second small diameter sections to merge in said first and second small diameter sections, said large diameter section being larger in diameter than each small diameter section, a floating member floatingly disposed in said large diameter section, said orifice being formed under cooperation of said floating member with a wall surface defining said through-hole, and means by which cross-sectional area of said orifice changes in accordance with angle of relative rotation between said drive and driven bodies.

18. A clutch disc as claimed in claim 17, wherein said orifice takes a first cross-sectional area when the relative rotation angle is larger than a predetermined level, and a second cross-sectional area when the relative rotation angle is smaller than said predetermined level, said first cross-sectional area being smaller than said second cross-sectional area.

19. A clutch disc as claimed in claim 18, wherein said floating member is annular and has an outer diameter larger than diameter of each of said first and second small diameter sections and smaller than diameter of said large diameter section, in which said orifice includes a first orifice having said first cross-sectional area and defined by inner periphery of said annular floating member, and a second orifice having said second cross-sectional area and defined between the outer periphery of said floating member and wall surface of said large diameter section.

20. A clutch disc as claimed in claim 19, wherein total of cross-sectional areas of said first and second orifices is larger than cross-sectional area of each of said first and second small diameter sections.

21. A clutch disc as claimed in claim 19, further comprising means defining a step-like face located between wall surfaces of said large diameter section and of each of said first and second small diameter section, said annular floating member being contactable with said step-like face to allow said fluid to flow through said first orifice.

22. A clutch disc as claimed in claim 18, wherein said floating member is spherical and has a diameter larger than diameter of each of said first and second small diameter sections and smaller than diameter of said large diameter section, in which said through-hole defining means includes means forming peripheral surface of each of said first and second small diameter sections non-circular to form a first orifice between the peripheral surface of said small diameter section and outer surface of said spherical floating member when said spherical floating member is biased to cover said small diameter section, said first orifice having said first cross-sectional area, said first orifice forming part of said orifice and having said first cross-sectional area.

23. A clutch disc as claimed in claim 22, wherein said orifices includes a second orifice defined between wall surface of said large diameter section and outer surface of said spherical floating member.

24. A clutch disc comprising:
a generally annular driven body including a radially outwardly extending flange section, and a periphery, said flange portion having a plurality of driven side arms, each of said arms having side faces, said arms extending radially outwardly and being located at equal intervals in a direction toward said periphery of said driven body;
a generally annular drive body including a cover section having an inner surface and a periphery, said cover section disposed to cover said flange section of said driven body, and a plurality of drive side arms which radially inwardly extend and are located at equal intervals in direction of the periphery of said drive body, said drive body being rotatably movably connected to said driven body;
a friction surface secured to an outer peripheral portion of said drive body;
means defining a plurality of fluid chambers each of which is defined between one of said driven side arms and one of said drive side arms, each adjacent two fluid chambers constituting a damping unit;
a fluid filled in said plurality of fluid chambers;
means defining a plurality of orifices one of which is formed to establish fluid communication between said adjacent two fluid chambers constituting said damping unit, each orifices being formed under cooperation of at least one of said drive and driven side arms;
a plurality of elastic means disposed in each of said fluid chambers and between said driven and drive side arms, to bias said driven and drive side arms in opposite directions; and
means for compensating volume change of said fluid within said fluid chamber due to temperature change of said fluid, said volume change compensating means including at least one elastic member defining a gas chamber in which a gas is confined, said elastic member being located in contact with said fluid within said fluid chambers.

25. A clutch disc as claimed in claim 24, further comprising means defining a through-hole formed in each of said drive and driven side arms, said through-hole being opened at opposite side faces of said arm.

26. A clutch disc as claimed in claim 25, wherein said at least one elastic member includes a ball-like elastic member made of an elastomeric material and disposed within said through-hole.

27. A clutch disc as claimed in claim 24, further comprising means defining first and second annular grooves at opposite side faces of said driven body flange section, each annular groove being located coaxial with said flange section.

28. A clutch disc as claimed in claim 27, wherein said elastic member includes first and second annular elastic tubes which are made of an elastomeric material and disposed within said first and second annular grooves, respectively.

29. A clutch disc as claimed in claim 24, further comprising means defining a hole formed in each driven side arm and opened at a side face of said drive side arm.

30. A clutch disc as claimed in claim 29, wherein said at least one elastic member includes an elastic diaphram made of an elastomeric material and disposed to close opening of said hole.

31. A clutch disc as claimed in claim 25, wherein said elastic member includes first and second elastic diaphrams made of an elastomeric material and located to cover opposite openings of said through-hole.

32. A clutch disc as claimed in claim 25, wherein said volume change compensating means includes means defining a space communicated with said fluid chambers, at least one movable wall member sealingly and movably disposed within said space, and biasing means for biasing said at least one movable wall member.

33. A clutch disc as claimed in claim 32, wherein said space defining means includes means defining first and second annular spaces each of which is formed between said driven body flange section and said drive body cover section, said first and second annular spaces being opened at opposite side faces of said driven body flange section, in which said at least one movable wall member includes first and second movable wall members disposed in said first and second annular spaces, respectively.

34. A clutch disc as claimed in claim 33, wherein said biasing means includes first and second spring members disposed in said first and second annular spaces, respectively, to bias said each movable wall member outwardly.

35. A clutch disc as claimed in claim 32, wherein said space defining means includes means defining an axially extending hole in each driven side arm and opened at a side face of said driven side arm, in which said at least one movable wall member includes a movable wall member disposed in said hole.

36. A clutch disc as claimed in claim 35, wherein said biasing means includes a spring member disposed in said hole to bias said movable wall member outwardly.

37. A clutch disc as claimed in claim 32, wherein said space defining means includes means defining an axially extending through-hole formed in each driven side arm and opened at opposite side faces of said driven side arm, in which said at least one movable wall member includes first and second movable wall members disposed in said through-hole and located spaced from each other.

38. A clutch disc as claimed in claim 37, wherein said biasing means includes a spring member disposed in said through-hole and located between said first and second movable wall members to bias said first and second movable wall members in opposite directions.

39. A clutch disc as claimed in claim 32, wherein said space defining means includes means defining a through-hole which is formed in each drive side arm and has a first end opened to a first face of said drive side arm defining one of said fluid chambers, and a second end opened to a second face of said drive side arm defining the other of said fluid chamber, in which said at least one movable wall member includes first and second movable wall members disposed in said through-hole and located spaced from each other.

40. A clutch disc as claimed in claim 39, wherein said biasing means includes a spring member disposed in said through-hole and located between said first and second movable wall members to bias said first and second movable wall members in opposite directions.

41. A clutch disc disc as claimed in claim 32, wherein said space defining means includes mean defining a through-hole formed in each driven side arm, and having first end opened to a first face of said driven side arm defining one of said fluid chambers and a second end face of said driven side arm defining the other of said fluid chambers, in which said at least one movable wall member includes first and second movable wall members disposed in said through-hole and located spaced from each other, said first and second movable wall members being biased in opposite directions.

42. A clutch disc as claimed in claim 24, further comprising means defining an annular chamber communicated with said fluid chambers to be supplied with said fluid.

43. A clutch disc as claimed in claim 42, wherein said annular chamber defining means includes an annular hollow casing secured to said drive body cover section, said hollow casing defining thereinside said annular chamber which is fluidly connected to a clearance formed between said drive body casing and said driven side arm, said hollow casing being coaxial with said drive body cover section.

44. A clutch disc as claimed in claim 42, wherein said at least one elastic member includes an elastic tube made of an elastomeric material and disposed in said annular chamber.

* * * * *